United States Patent
Manzoor et al.

(10) Patent No.: US 9,322,453 B2
(45) Date of Patent: Apr. 26, 2016

(54) MATERIAL COMPENSATION JOINT AND RADIAL VIBRATION DAMPER HAVING SAME

(71) Applicant: Dayco IP Holdings, LLC, Springfield, MO (US)

(72) Inventors: Suhale Manzoor, Plymouth, MI (US); Doug Averill, Holly, MI (US); Bruce G. Christenson, Canton, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 18 days.

(21) Appl. No.: 14/248,237

(22) Filed: Apr. 8, 2014

(65) Prior Publication Data

US 2014/0315648 A1 Oct. 23, 2014

Related U.S. Application Data

(60) Provisional application No. 61/809,692, filed on Apr. 8, 2013.

(51) Int. Cl.
*F16C 3/02* (2006.01)
*F16F 15/12* (2006.01)
*F16F 15/126* (2006.01)
*F16D 1/08* (2006.01)

(52) U.S. Cl.
CPC .......... *F16F 15/1201* (2013.01); *F16D 1/0835* (2013.01); *F16F 15/126* (2013.01); *Y10T 464/50* (2015.01)

(58) Field of Classification Search
CPC .. F16F 15/1201; F16F 15/126; F16D 1/0835; Y10T 464/50
USPC .............. 464/89–91, 127, 180; 188/378, 379; 403/372; 29/451; 285/374
See application file for complete search history.

(56) References Cited

U.S. PATENT DOCUMENTS

| | | | | |
|---|---|---|---|---|
| 1,424,203 A * | 8/1922 | Keller | .......................... | 464/91 X |
| 3,424,287 A * | 1/1969 | Dreiding | ..................... | 464/91 X |
| 3,884,510 A * | 5/1975 | Bram | ......................... | 285/374 X |
| 4,191,384 A * | 3/1980 | Svedberg | ..................... | 29/451 X |
| 5,348,345 A * | 9/1994 | Dykema et al. | ............. | 464/89 X |
| 8,863,390 B1 * | 10/2014 | Ley et al. | .................. | 464/180 X |
| 2009/0000422 A1 * | 1/2009 | Christenson et al. | ..... | 188/379 X |

OTHER PUBLICATIONS

"Definition of hub in English"; Oxford dictionary—American English; https://web.archive.org/web/20130804152605/http://oxforddictionaries.com/us/definition/american_english/hub pp. 1-2 (Aug. 4, 2013).

* cited by examiner

*Primary Examiner* — Gregory Binda
(74) *Attorney, Agent, or Firm* — Thompson Hine LLP

(57) ABSTRACT

Mating components that are mateable to another component to share the same axis of rotation, assemblies including the mating component mated to another component, and methods of mating them together are disclosed. The mating component includes a hub having an engaging portion defining an endless channel recessed therein. The endless channel has a surface that defines one or more trenches therein and an elastomeric band seated against that surface in an uncompressed state. The elastomeric band has an outermost dimension relative to the endless channel that is larger than the inner or outer dimension defined by the engaging portion of the hub and thereby defines an unchanneled portion of the elastomeric band, which has a volume that is equal to or less than the total volume of the one or more trenches.

17 Claims, 5 Drawing Sheets

Loosest Fit

Tightest Fit

Nominal Fit

MATERIAL COMPENSATION JOINT AND RADIAL VIBRATION DAMPER HAVING SAME

RELATED APPLICATIONS

This application claims the benefit of U.S. Provisional Application No. 61/809,692, filed on Apr. 8, 2013, which is incorporated herein by reference in its entirety.

TECHNICAL FIELD

The present invention generally relates to a device for attaching two axially aligned components, more particularly, to radial vibration dampers for forming a material compensation joint connection to a shaft to eliminate or reduce problems of attachment with traditional interference fit.

BACKGROUND

Interference fits are often employed to hold two axially aligned components (such as shafts, bushings, bearings etc.) with respect to each other. Simply put, an interference fit is achieved when the outer cylindrical surface of a first component is forced into the inner cylindrical surface of a second component such that the diameter of the outer cylindrical surface of the first component is larger than the diameter of the inner cylindrical surface of the second component. By this arrangement, the components mutually exert radial pressure and effectively hold each other in position.

It can be appreciated that interference fits are possible if mating surfaces belonging to both interacting components are manufactured to tight geometric tolerances. If one component is manufactured via a process that is not capable of maintaining tight tolerances, then the other component would not properly assemble despite the tightness of its tolerance. Consequently, an interference fit would not be possible to hold the two components in place.

Furthermore, it can be appreciated that when the geometry of the two mating components is such that the two mating surfaces need to traverse mutually across a considerable distance till the first component is positioned appropriately with respect to the second a traditional interference fit has other inherent problems. Such problems include but are not limited to encountering excessive assembly forces, damaging either one or both of the mating components, and the general inability to properly control the final seating location of the first component with respect to the second component.

SUMMARY

The assembly of the mating components disclosed herein with another component about a common axis are premised on the realization that many such assemblies do not require the structural integrity assured by an engineered interference fit. An adequate fit can be provided if an elastomer band is fitted into a channel that is cut into one of the components and this subassembly is then located with respect to its mating component.

In one aspect mating components are disclosed that include a hub having an engaging portion defining either the innermost or outermost radially oriented surface thereof and defining an endless channel recessed into the innermost or outermost radially oriented surface. The endless channel includes a surface that defines one or more trenches. The mating components also include an endless elastomeric band, in an uncompressed state, seated against the surface of the endless channel that defines the one or more trenches. This endless elastomeric band has an outermost dimension relative to the endless channel that is larger than the inner or outer dimension defined by the innermost or outermost radially oriented surface of the hub and thereby defines an unchanneled portion of the elastomeric band, which has a volume that is equal to or less than the total volume of the one or more trenches.

In one embodiment, the trenches form annular rings laterally spaced across the width of the endless channel. In one embodiment, the elastomeric band is compressible between about one-half to about three-quarters of its total volume.

In one embodiment, the mating component is a radial vibration damper and further includes one or more elastomeric members and one or more inertia members coupled to the hub for rotation therewith. The radial vibration damper also includes one or more fasteners operatively coupling the hub, one or more elastomeric members, and the one or more inertia members for rotation together as a unit.

In another aspect, assemblies are disclosed that include the above described mating components mated to a shaft through a material compensation joint formed by compression of the elastomeric band against a surface of the shaft and compressed into the endless channel. As a result of the compression of the elastomeric band a portion of the elastomeric band is present in the trenches of the endless channel. In one embodiment, the shaft is hollow and has an interior surface and the mating component is a radial vibration damper. Accordingly, the act of mating these two components together includes fitting the radial vibration damper against the interior surface of the shaft. Here, the outermost dimension of the elastomeric band is larger than the inner dimension of the hollow shaft, thereby compressing the elastomeric band.

In another embodiment, the act of mating includes sliding the radial vibration damper over an outer surface of the shaft. Here, the outermost dimension of the elastomeric band relative to the endless channel is smaller than the outer dimension of the shaft, thereby compressing the elastomeric band.

In another aspect, methods of assembling a mating component with a shaft is disclosed. The method includes providing a mating component as described above, providing a shaft having an axis of rotation, and mating the mating component and the shaft with the engaging surface facing either an interior surface or an exterior surface of the shaft with the elastomeric band compressed therebetween. In the assembled state a portion of the elastomeric band, as a result of the compression, is present in the trenches of the channel. In one embodiment, the trenches are filled with elastomeric material from the elastomeric band. In another embodiment, the trenches are partially filled with elastomeric material from the elastomeric band.

In one embodiment, the shaft is hollow and the mating includes fitting the radial vibration damper within the shaft. In another embodiment, mating includes sliding the radial vibration damper over an outer surface of the shaft, and wherein the outermost dimension of the elastomeric band relative to the endless channel is smaller than the outer dimension of the shaft, thereby compressing the elastomeric band.

DETAILED DESCRIPTION

Figure 1:
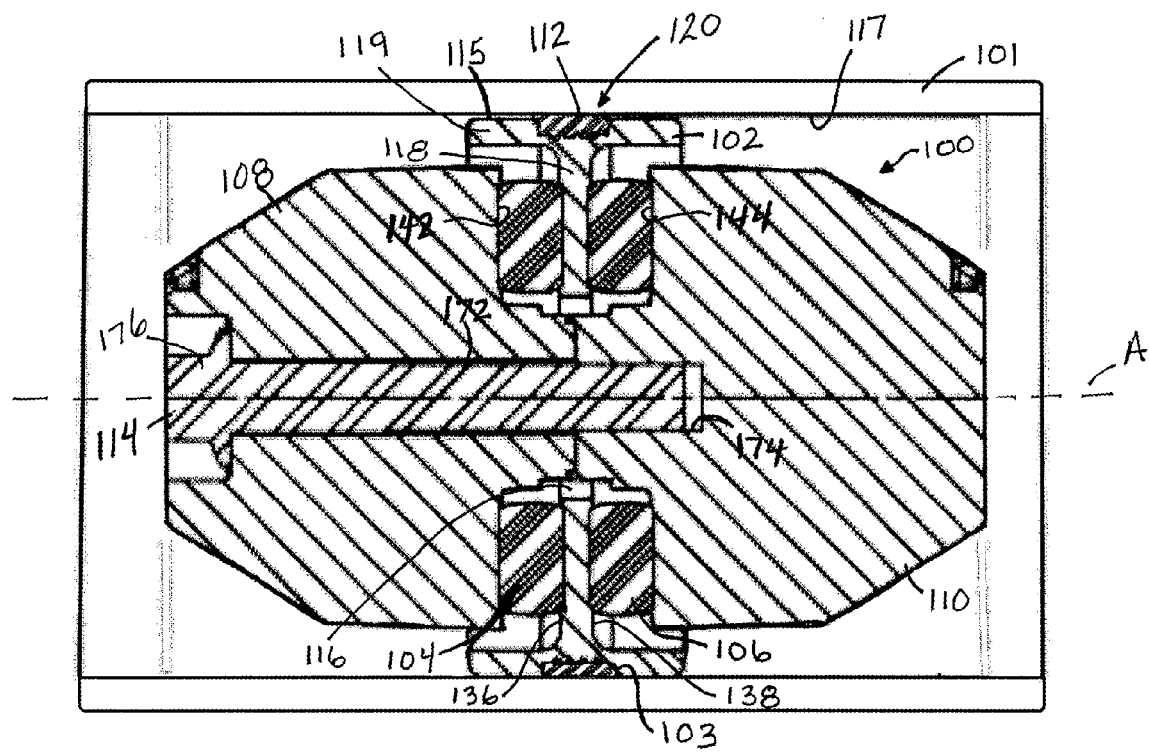
FIG. 1 is a longitudinal cross-sectional view of one embodiment of a radial vibration damper having a material compensation joint connection to the interior surface of a hollow shaft.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

As disclosed herein, the introduction of an elastomeric band fitted inside a channel would eliminate the need for one of the two mating components to have tight tolerances while still retaining the integrity required from the resulting material compensation joint. Additionally, the material compensation joint assists in isolating the vibrations travelling from one component to the other, thereby enhancing the fatigue life of other attached components. The examples used herein include a radial vibration damper and a shaft as the two components being mated using a material compensation joint, but the material compensation joint may be used in almost all aspects of machine design where two components are joined along the same axis, in particular, the same axis of rotation, including but not limited to coupling two shafts; and attaching components such as bearings, vibration dampers, etc. to shafts.

Figure 2:
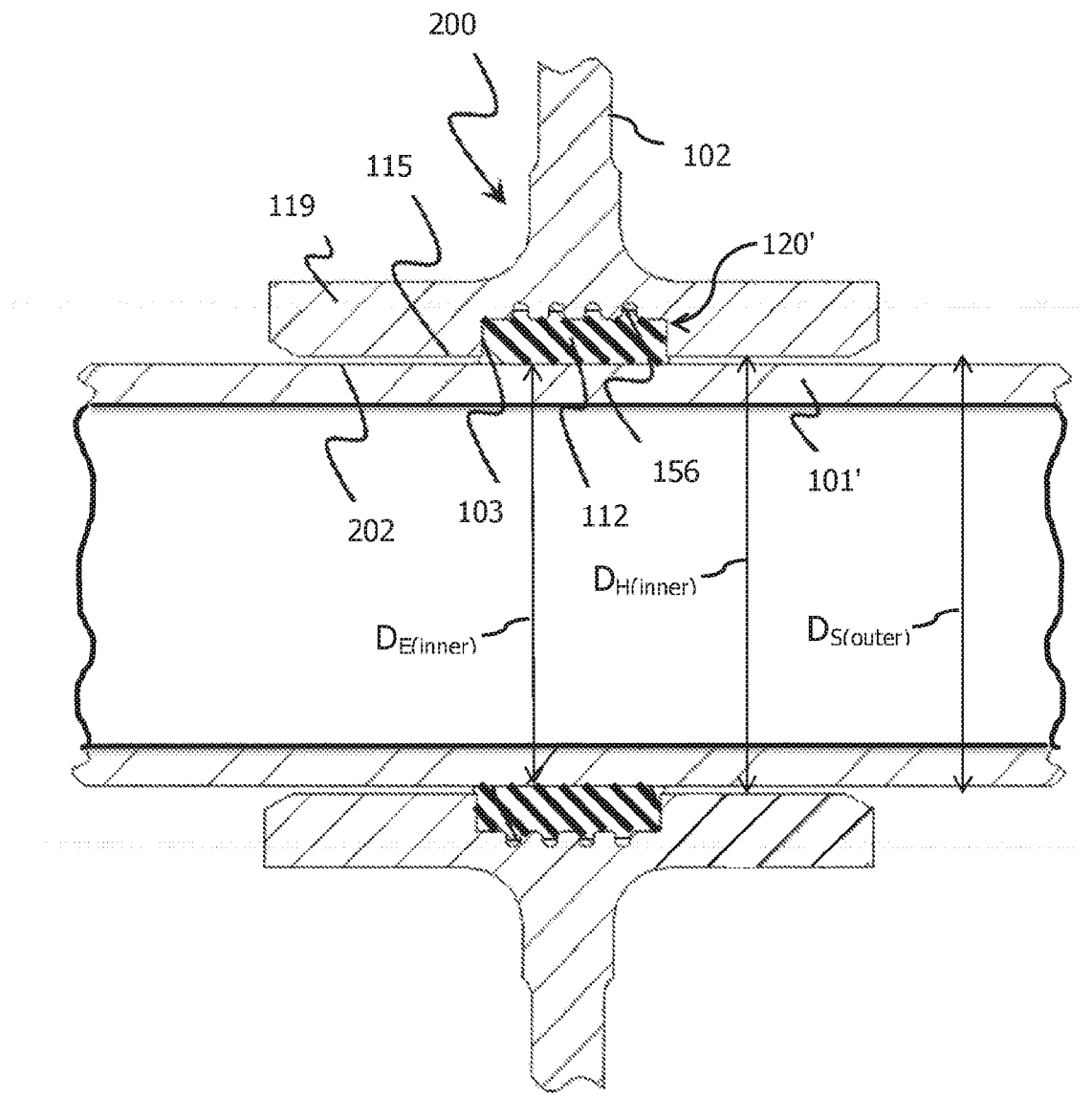
FIG. 2 is a longitudinal cross-sectional view of alternate embodiment having a radial vibration damper having a material compensation joint connection to the exterior surface of a shaft.

In FIG. 1, a radial vibration damper 100, a mating component, is shown fitted inside a hollow shaft 101, a receptacle component, by a material compensation joint 120 that eliminates the problems of tight tolerances required for an interference fit. While FIG. 1 illustrates the radial vibration damper 100 on the inside of a shaft, it is also appreciated that a material compensation joint can connect a radial vibration damper to an external surface of a shaft. This alternate embodiment is shown in FIG. 2 with a radial vibration damper 200 connected to a shaft 101' by material compensation joint 120'. The components of the radial vibration damper 100 in FIG. 1 as disclosed herein are equally applicable to radial vibration damper 200 in FIG. 2, even if not shown. In either embodiment, the shaft 101, 101' may be a drive shaft, propshaft, half-shaft, or the like used in automotive applications, but is not limited thereto. The shafts 101, 101' are usually manufactured through a forming process that does not allow for tight tolerances to be maintained at its inner and/or outer dimensions. These tolerances do not permit a proper interference fit of the shaft 101, 101' with another mating component such as the radial vibration dampers 100, 200. The radial vibration dampers 100, 200 utilize an elastomeric band 112 received in a channel 103 of either the radial vibration damper or the shaft (FIG. 7) to exert a hydrostatic pressure on the walls of the channel 103 and the opposing surface placing the elastomeric band 112 in compression.

Now referring to FIG. 1, the radial vibration damper 100 includes from left to right, relative to the orientation of the drawing relative to the page, fastener 114, a first inertia member 108, a first elastomeric member 104, a hub 102 having an elastomeric band 112 seated in a channel 103 recessed into the outermost radially oriented surface 115 thereof, a second elastomeric member 106 and a second inertia member 110. These components are operatively coupled together by the fasteners 114 for rotation together as a unit with the hollow shaft 101 about the axis A of the hollow shaft 101 as it rotates. There is no relative rotation of any components and no translation of any components relative to another component during rotation of the hollow shaft 101. In other words, the radial vibration damper 100 is held in place within the hollow shaft 101 without axial movement (creep). The material compensation joint 120 provides an adequate fit between the hub 102 of the rotational vibration damper 100 and the interior surface 117 of the hollow shaft 101 without requiring precision dimensions for the inner dimensions of the hollow shaft 101, for example the diameter of the hollow shaft when the hollow shaft has a generally circular cross-section, and for the outermost radially oriented surface 115 of the hub 102 mating therewith.

The hub 102 includes a plate portion 118 and a shaft engaging portion 119. The plate portion 118 is oriented generally transverse to the central longitudinal axis A of the hollow shaft 110 and the shaft engaging portion 119 is an annular body defining the outermost side of the plate portion 118. When viewed in the longitudinal cross-section of FIG. 1, the shaft engaging portion 119 can be described as a flange extending generally perpendicularly from the outermost radial end of the plate portion 118 in both directions, i.e., to the left and to the right in FIG. 1. The shaft engaging portion 119 defines the outermost radially oriented surface 115 of the hub 102, which has the channel 103 recessed therein.

Figure 3:
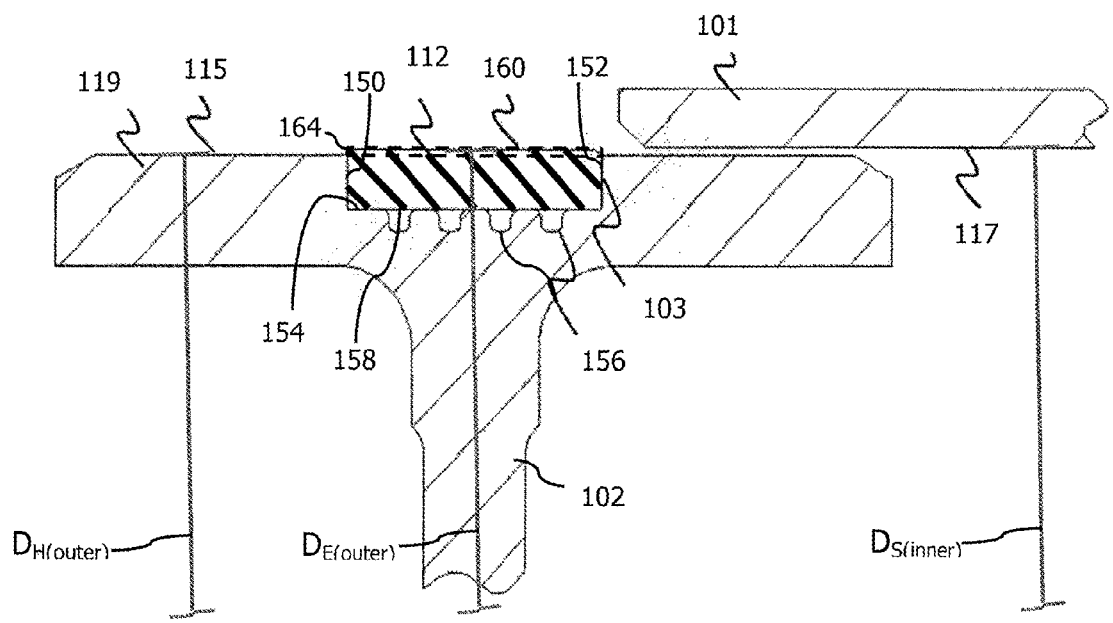
FIG. 3 is a partial cross-sectional view illustrating the components of the material compensation joint of FIG. 1 in an unassembled state.

The channel 103 may have, but is not limited to, a generally open rectilinear cross-section as seen in FIGS. 1 and 3. In three dimensions the channel 103, as labeled in FIG. 3, may be described as an endless channel 103 that includes two planar parallel ring shaped surfaces 150, 152 that are joined by a convex cylindrical surface 154. Formed within the convex cylindrical surface 154 are one or more trenches 156, which may be shaped as annular rings laterally spaced across the width of the channel 103. In one embodiment, the trenches 156 may include two planar parallel ring shaped sides connected by a convex cylindrical surface. While the trenches 156 are illustrated in the figures as being in the convex cylindrical surface 154, they may also be present in one or more of the side surfaces 150, 152 alone or in combination with the convex cylindrical surface 154. The trenches 156 are present to receive portions of the elastomeric member 112 as it is placed in compression between the hub 102 and the shaft 101.

The elastomeric band 112 may be generally rectangular in cross-section, but is not limited thereto. The elastomeric band 112 includes opposing inner and outer concentric cylindrical surfaces 158, 160, respectively, relative to the shaft engaging portion 119 of the hub 102, connected at their opposite ends by two planar parallel ring shaped surfaces. The elastomeric band may have a generally low tensile modulus and high yield strain. The elastomer is preferably one suitable for automotive engine applications, i.e., suitable to withstand temperatures experienced in the engine and road temperatures and conditions. In one embodiment, the elastomer members may be made from or include one or more of a styrene-butadiene rubber, a natural rubber, a nitrile, a nitrile butadiene rubber, an ethylene propylene diene monomer (EPDM), an ethylene acrylic elastomer, a hydrogenated nitrile butadiene rubber, a polybutadiene, and a polycholoroprene rubber. One example of an ethylene acrylic elastomer is VAMAC® ethylene acrylic elastomer from E. I. du Pont de Nemours and Company. The elastomeric member may be a composite material that optionally includes a plurality of fibers dispersed therein. The fibers may be continuous or fragmented (chopped) aramid fiber like the fiber sold under the name TECHNORA® fiber.

Still referring to FIG. 1, the hub 102 includes a bore 116 through a plate portion 118 thereof to receive at least the fastener 114 to couple the first and second inertia members 108, 110 together. As seen in FIG. 1, the bore 116 may be large enough for a portion of one or both the first and second inertia members 108, 110 to be received therein. When assembled, the first and second inertia members 108, 110 compress the first and second elastomeric members 104, 106, respectively against opposing sides 136, 138 of the plate portion 118 of the hub 102. Accordingly, the first and second inertia members 108, 110 each include a compression surface 142, 144, respectively, facing the plate portion 118 of the hub 102 and contacting its respective elastomeric member 104, 106.

The hub 102 may be cast, spun, forged, machined, or molded using known or hereinafter developed techniques. Suitable material for the hub 102 include iron, such as gray cast iron and/or nodular iron, steel, aluminum, other suitable metals, plastics, or a combination thereof, including composite materials.

The first and second inertia members 108, 110 may be made from any material having a sufficient mass, usually a cast iron metal.

While the first and second elastomeric members 104, 106 are illustrated as having generally uniform rectangular cross-sections in compression against the plate portion 118 of the hub 102, they are not limited thereto. In other embodiments, the elastomeric members 104, 106 may each be one or more O-rings, X-rings, V-rings, square rings, or other rings of elastomeric material. The first and second elastomeric members 104, 106 may be any suitable elastomer to absorb and/or dampen the torsional vibrations generated by a rotating shaft upon which the radial vibration damper 100 is mounted. The elastomeric members may have a generally low tensile modulus and high yield strain and may be made from the same or different elastomers. The elastomer is preferably one suitable for automotive engine applications, i.e., suitable to withstand temperatures experienced in the engine and road temperatures and conditions and may be made of or include the same materials listed above for the elastomeric band 112.

The fastener 114 may be one or more bolts, screws, rivets, or the like. In FIG. 1, the fastener 114 is a threaded bolt threaded into threaded bores 172, 174 of the first and second inertia members 108, 110, respectively. The fastener 114 and the first inertia member 108 may be such that the head portion 176 is countersunk into the first inertia member 108.

Figure 4:
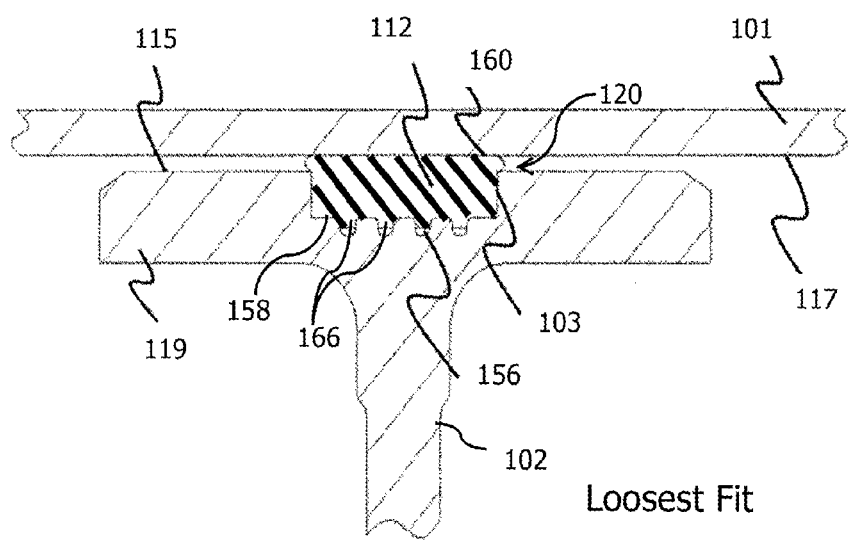
FIG. 4 is a partial cross-sectional view illustrating the components of the material compensation joint of FIG. 1 assembled at the condition of the loosest possible fit.

FIGS. 3 and 4 are enlarged views of the material compensation joint of FIG. 1 in an unassembled state and in a loosest fit assembled state, respectively. In the unassembled state of FIG. 3, the elastomeric band 112 has an outer dimension $D_{E(outer)}$, a diameter when the shaft engaging surface 119 is cylindrically-shaped, defined by the outer concentric cylindrical surface 160. To facilitate the formation of a material compensation joint 120 of FIGS. 1 and 4-6, in the unassembled state, the outer dimension $D_{E(outer)}$ of the elastomeric band 112 is larger than the outer dimension $D_{H(outer)}$ of the hub, defined by the shaft engaging surface 119, and is larger than the inner dimension $D_{S(inner)}$ of the hollow shaft 101 as shown in FIG. 3. Since the outer dimension $D_{E(outer)}$ is larger than the outer dimension $D_{H(outer)}$ of the hub, there is an unchanneled portion 164, represented by the dashed box in FIG. 3, of the elastomeric member 112 in the unassembled state where the inner concentric cylindrical surface 158 is seated on the convex cylindrical surface 154 (without any of the elastomeric member 112 in the trench(es) 156). Additionally, since the outer dimension $D_{E(outer)}$ is larger than the inner dimension $D_{S(inner)}$, the elastomeric band 112 will be compressed when the radial vibration damper 100 is fitted within the shaft 101.

The elastomeric band 112 is constructed such that the unchanneled portion 164 has a volume that is equal to or less than the total volume of the trenches 156. The elastomeric band 112 may also be constructed such that it compresses between one-half to three-quarters of its total volume. This allows the elastomeric material of the elastomeric band 112 to flow and be accepted into the trenches 156 when the shaft engaging portion 119 of the radial vibration damper 100 and the interior surface 117 of the hollow shaft 101 make a line to line fit or interference fit.

Now turning to FIG. 4, when compressed during the mating of the radial vibration damper 100 and the shaft 101, the elastomeric band 112 displaces at least some of the unchanneled portion 164 into the channel 103 and a portion of the elastomeric band 112 is thereby displaced into the one or more trenches 156 (referred to as the trenched portion 166). FIG. 4 illustrates a loosest fit where the elastomeric band 112 is compressed between one-quarter to three-quarters of its total volume, but does not fill the one or more trenches 156. Here, the inner dimension $D_{S(inner)}$ of the hollow shaft 101 is at its largest possible dimension and the outermost radially oriented surface 115 is at its smallest possible dimension that still places the elastomeric band in compression to form the material compensation joint 120. The elastomeric band 112 under compression simultaneously exerts hydrostatic pressure upon the inner surface 117 of the hollow shaft 101, and all the walls of the channel 103. This hydrostatic pressure holds two components together, i.e., holds the radial vibration damper in place, at the material compensation joint 120.

Figure 5:
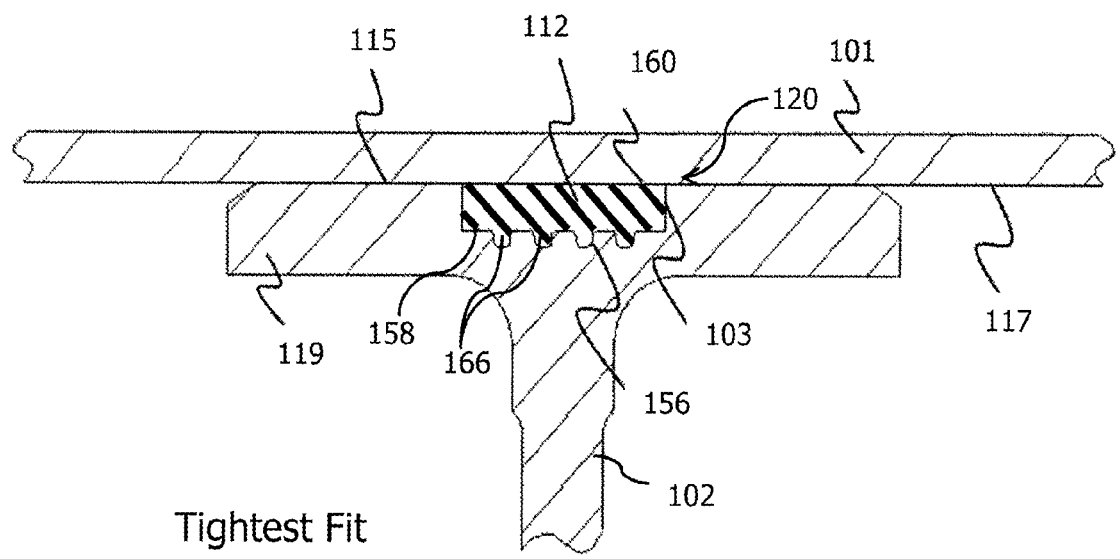
FIG. 5 is a partial cross-sectional view illustrating the components of the material compensation joint of FIG. 1 assembled at the condition of the tightest possible fit.

Now turning to FIG. 5, a tightest fit for the material compensation joint is illustrated. Here, the inner dimension $D_{S(inner)}$ of the hollow shaft 101 is at its smallest possible dimension and the shaft engaging portion 119 is at its largest possible dimension $D_{S(outer)}$ that still places the elastomeric band in compression to form the material compensation joint 120. The elastomeric band 112 is compressed to the extent that a volume generally equivalent to the unchanneled portion 164 is completely received in the trenches 156, i.e., the trenches are filled. Here, the shaft engaging portion 119 has an outer dimension $D_{S(outer)}$ with an adequate interference fit with the inner surface 117 of the hollow shaft 101 thereby mutually exerting radial pressure upon one another. This hydrostatic pressure holds the two components together at the material compensation joint 120.

Figure 6:
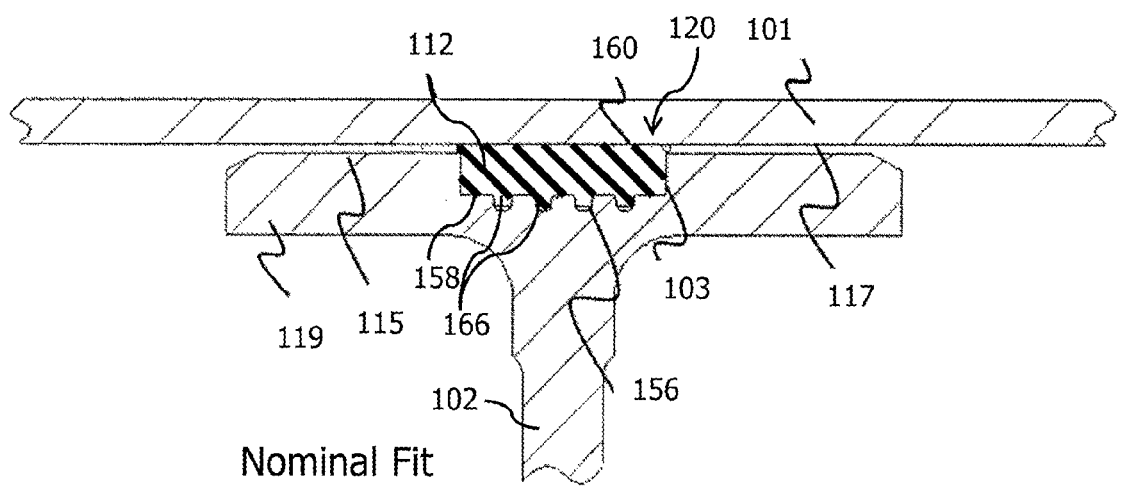
FIG. 6 is a partial cross-sectional view illustrating the components of the material compensation joint FIG. 1 assembled at the condition of the nominal fit.

Now turning to FIG. 6, a nominal fit for the material compensation joint is illustrated. Here, the inner dimension $D_{S(inner)}$ of the hollow shaft 101 is at its nominal condition and the outer dimension $D_{S(outer)}$ of the shaft engaging portion 119 is at its nominal condition. Once again the elastomeric band 112 is compressed against the inner surface 117 of the hollow shaft 101 as the radial vibration damper 100 is inserted therein. Between one-half to three-quarters of the elastomeric band's 112 total volume is compressed and accommodated by flow into the trench(es) 156. Similarly to the loosest fit, the elastomeric band 112 under compression simultaneously exerts hydrostatic pressure upon the inner surface 117 of the hollow shaft 101, and all the walls of the channel 103. This hydrostatic pressure holds two components together, i.e., holds the radial vibration damper in place, at the material compensation joint 120.

Referring back to FIG. 2, when the radial vibration damper 200 is fitted to the outer surface 202 of the shaft 101', all the same considerations for the material compensation joint 120' are equally applicable as described above with respect to a loosest fit, tightest fit, and nominal fit with the exception that inner and outer are reversed. Here, shaft 101' is not required to be hollow.

Figure 7:
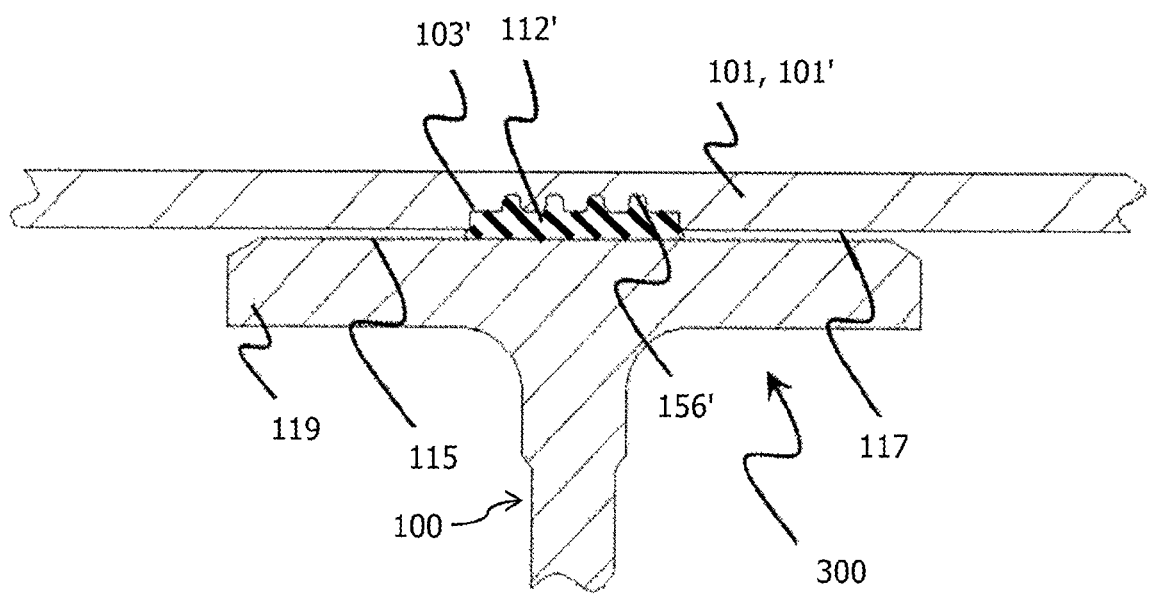
FIG. 7 is a partial cross-sectional view illustrating a second embodiment having the elastomeric band seated in a channel in a surface of the shaft rather than in the hub of the radial vibration damper.

Now turning to FIG. 7, both of the embodiments in FIGS. 1 and 2 may have an alternate construction 300 where the channel, designated as 103', is included in the surface of the shaft 101, 101' that engages the shaft engaging portion 119 of the radial vibration damper 100, 200, respectively, rather than being part of the radial vibration damper 100. The channel 103' includes one or more trenches 156' as described above and an elastomeric band 112' is received therein. The elastomeric band 112' is as described above, including an unchanneled portion that is compressible when the shaft 101, 101' is fitted with the radial vibration damper 100, 200. In operation and explanation, this embodiment will operate and be constructed generally similarly to that described above, just with respect to a different component of the assembly.

Although the invention is shown and described with respect to certain embodiments, it is obvious that modifications will occur to those skilled in the art upon reading and understanding the specification, and the present invention includes all such modifications.

What is claimed is:

1. A mating component mateable to another component to share a same axis of rotation, the mating component comprising:
   a hub having a plate portion terminating in an engaging portion defining either the innermost or outermost radially oriented surface thereof and defining an endless channel concentric about the axis of rotation and recessed into the innermost or outermost radially oriented surface, wherein a surface of the endless channel defines one or more-trenches therein;
   one or more elastomer members compressed axially against the plate portion by one or more inertia members;
   an endless elastomeric band seated concentrically about the axis of rotation in the endless channel against the surface defining the one or more trenches in an uncompressed state;
   wherein the endless elastomeric band has a thickness relative to the endless channel, when seated therein in the uncompressed state, that defines an unchanneled portion of the elastomeric band extending beyond the inner or outer dimension defined by the innermost or outermost radially oriented surface of the hub, and the unchanneled portion has a volume that is equal to or less than the total volume of the one or more trenches.

2. The mating component of claim 1, wherein the one or more trenches form annular rings laterally spaced across the width of the endless channel.

3. The mating component of claim 1, wherein the elastomeric band is compressible between about one-half to about three-quarters of its total volume.

4. The mating component of claim 1, further comprising one or more fasteners operatively coupling the hub, the one or more elastomeric members, and the one or more inertia members for rotation together as a unit.

5. The mating component of claim 1, wherein the one or more trenches form annular rings laterally spaced across the width of the endless channel.

6. An assembly comprising:
   a shaft having an axis of rotation;
   a mateable component according to claim 1 connected to the shaft through a material compensation joint formed by compression of the elastomeric band against a surface of the shaft and into the endless channel;
   wherein a portion of the elastomeric band, as a result of the compression, is present in the one or more trenches of the endless channel.

7. The assembly of claim 6, wherein the one or more trenches form annular rings laterally spaced across the width of the endless channel.

8. The assembly of claim 6, wherein the elastomeric band is compressible between about one-half to about three-quarters of its total volume.

9. The assembly of claim 6, wherein the shaft is hollow and has an interior surface, wherein mating includes fitting the mating component against the interior surface of the shaft, and wherein the outermost dimension of the elastomeric band is larger than the inner dimension of the hollow shaft, thereby compressing the elastomeric band.

10. The assembly of claim 6, wherein the mateable component was slid over an outer surface of the shaft.

11. An assembly comprising:
    first and second axially aligned components;
    the first component comprising a hub having a plate portion terminating in a second component-engaging portion defining either the innermost or outermost radially oriented surface thereof;
    one or more elastomeric members compressed axially against the plate portion by one or more inertia members;
    the second component comprising a first component-engaging surface having an endless channel recessed therein, wherein a surface of the endless channel defines one or more trenches therein, and comprising an endless elastomeric band seated against the surface of the endless channel defining the one or more trenches in an uncompressed state;
    wherein the endless elastomeric band has a thickness relative to the endless channel, when seated therein in the uncompressed state, that defines an unchanneled portion of the elastomeric band extending beyond the inner or outer dimension defined by the innermost or outermost radially oriented surface of the second component, and the unchanneled portion has a volume that is equal to or less than the total volume of the one or more trenches.

12. The assembly of claim 11, wherein the one or more trenches are filled with elastomeric material from the elastomeric band.

13. The assembly of claim 11, wherein the one or more trenches are partially filled with elastomeric material from the elastomeric band.

14. The assembly of claim 11, wherein the one or more trenches form annular rings laterally spaced across the width of the endless channel.

15. A method of assembly comprising:
    providing a mating component comprising:
        a hub having an engaging portion defining either an innermost or outermost radially oriented surface of the hub and defining an endless channel recessed into the innermost or outermost radially oriented surface, wherein a surface of the endless channel defines a plurality of trenches therein;

an endless elastomeric band seated against the surface of the endless channel defining the plurality of trenches in an uncompressed state;

wherein the endless elastomeric band has a thickness relative to the endless channel, when seated therein in the uncompressed state, that defines an unchanneled portion of the elastomeric band extending beyond the inner or outer dimension defined by the innermost or outermost radially oriented surface of the hub, and the unchanneled portion has a volume that is equal to or less than the total volume of the plurality of trenches;

providing a shaft having an axis of rotation; and mating the mating component and the shaft with the engaging surface facing either an interior surface or an exterior surface of the shaft with the elastomeric band compressed therebetween, wherein mating includes sliding the mating component over an outer surface of the shaft, and wherein the outermost dimension of the elastomeric band relative to the endless channel is smaller than the outer dimension of the shaft, thereby compressing the elastomeric band;

wherein a portion of the elastomeric band, as a result of the compression, is present in one or more of the plurality of trenches of the channel.

16. The method of claim 15, wherein the one or more trenches are filled with elastomeric material from the elastomeric band.

17. The method of claim 15, wherein the one or more trenches are partially filled with elastomeric material from the elastomeric band.

* * * * *